United States Patent
Ali

(10) Patent No.: US 10,706,882 B1
(45) Date of Patent: Jul. 7, 2020

(54) SERVO WEDGE SKIPPING DURING TRACK SEEKING

(71) Applicant: Seagate Technology LLC, Cupertino, CA (US)

(72) Inventor: Abbas Ali, Prior Lake, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/539,057

(22) Filed: Aug. 13, 2019

(51) Int. Cl.
*G11B 5/56* (2006.01)
*G11B 5/596* (2006.01)
*G11B 5/31* (2006.01)
*G11B 5/55* (2006.01)

(52) U.S. Cl.
CPC ........ *G11B 5/59688* (2013.01); *G11B 5/3133* (2013.01); *G11B 5/5556* (2013.01)

(58) Field of Classification Search
CPC ...... G11B 5/59633; G11B 2020/10916; G11B 2020/1267; G11B 20/1217; G11B 5/59655; G11B 5/59688; G11B 2020/1238; G11B 2020/1283; G11B 2020/1292; G11B 2020/1457; G11B 2220/2516; G11B 5/59605
USPC .... 360/77.01, 77.06, 75, 48, 59, 313, 77.08, 360/40, 49
See application file for complete search history.

(56) References Cited

U.S. PATENT DOCUMENTS

| | | | |
|---|---|---|---|
| 5,579,186 A * | 11/1996 | Yamamoto | G11B 5/5543 360/75 |
| 8,767,341 B1 | 7/2014 | Coker et al. | |
| 10,163,459 B1 | 12/2018 | French, Jr. | |

* cited by examiner

*Primary Examiner* — Nabil Z Hindi
(74) *Attorney, Agent, or Firm* — Faegre Drinker Biddle & Seagate Technology LLC

(57) ABSTRACT

A method includes processing, via an integrated circuit, data read from a first servo wedge; processing, via the integrated circuit, data from a second servo wedge; and skipping processing data from a third servo wedge positioned between the first servo wedge and the second servo wedge.

18 Claims, 6 Drawing Sheets

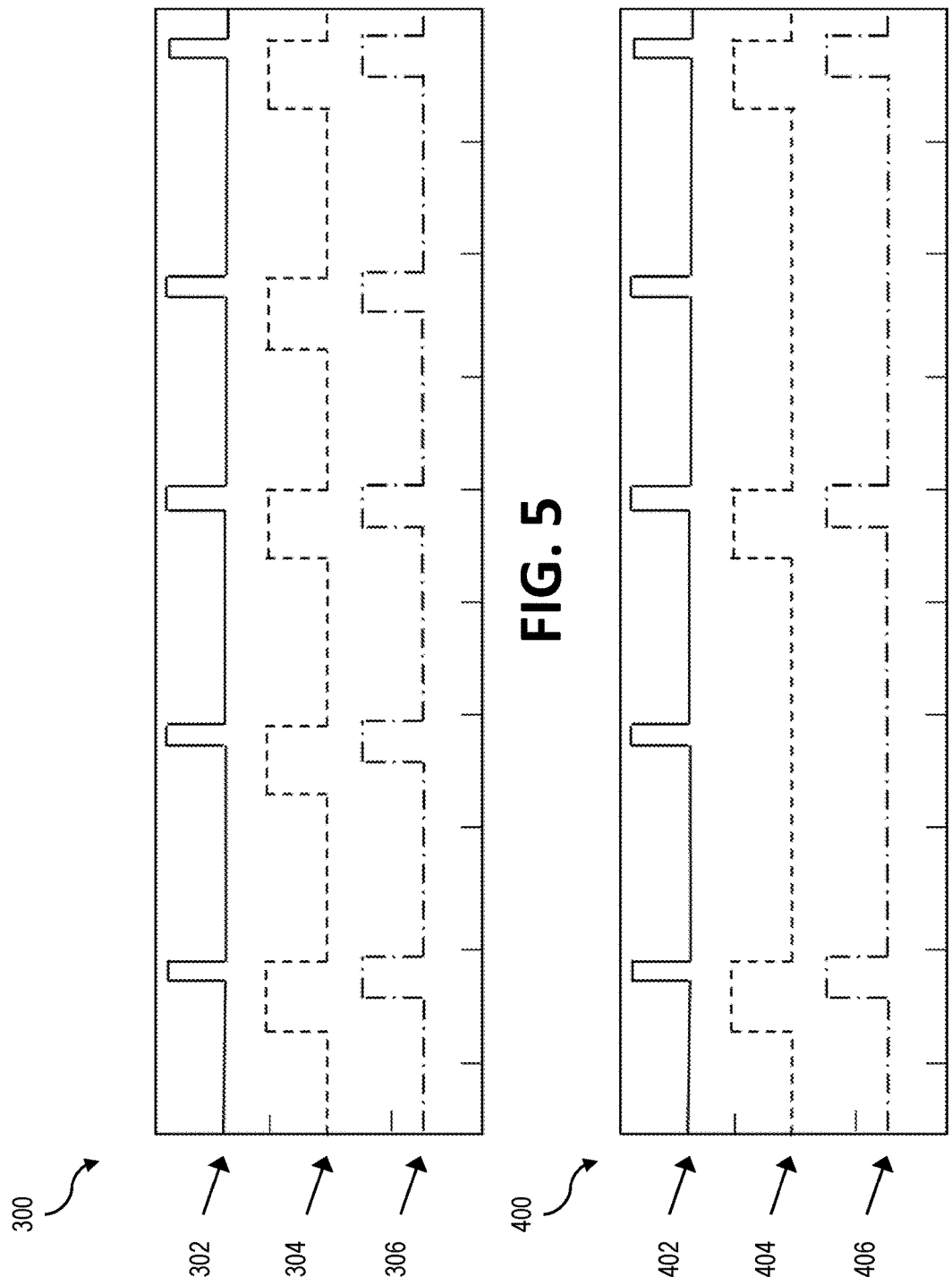

SERVO WEDGE SKIPPING DURING TRACK SEEKING

In certain embodiments, a method includes processing, via an integrated circuit, data read from a first servo wedge; processing, via the integrated circuit, data from a second servo wedge; and skipping processing data from a third servo wedge positioned between the first servo wedge and the second servo wedge.

In certain embodiments, an integrated circuit includes control circuitry configured to predict a beginning of a first servo wedge, a second wedge, and a third servo wedge positioned between the first servo wedge and the second servo wedge. The control circuitry is also configured to increase power consumption to process data read from the first servo wedge and the second servo wedge but not the third servo wedge.

In certain embodiments, a data storage device includes a magnetic recording medium and an integrated circuit. The magnetic recording medium includes a first servo wedge, a second servo wedge, and a third servo wedge positioned between the first servo wedge and the second servo wedge. The integrated circuit is configured to process data read from the first servo wedge and the second servo wedge but not the third servo wedge.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIGS. 5 and 6 show graphs, in accordance with certain embodiments of the present disclosure.

Figure 1:
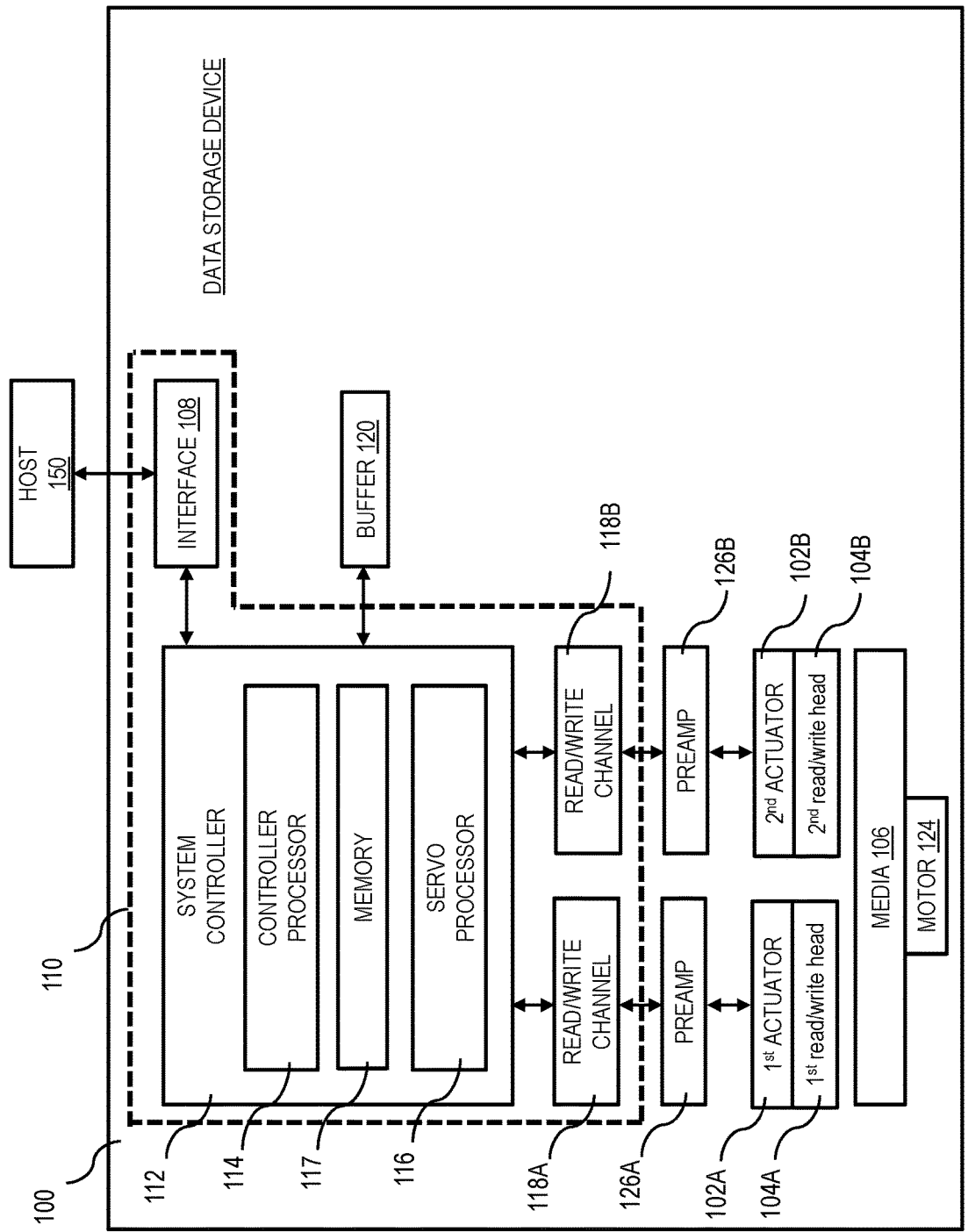
FIG. 1 shows a block diagram of a data storage device, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Data storage devices such as hard disk drives use servo control systems to position read/write heads above desired tracks on magnetic recording media for carrying out reading and writing operations. To help with positioning, servo control systems process servo data read from what are referred to as servo sectors, which form part of servo wedges on the magnetic recording media. Currently, data storage devices read and process servo data from each servo wedge as the servo wedge is passed over by the read/write heads. The number of servo wedges in data storage devices continues to increase as the number of data tracks in data storage devices continues to increase. As a result, data storage devices spend more time and power reading and processing servo data from servo wedges. This increase in power consumption is because various components of the data storage devices such as read/write channels, preamplifiers, and others must operate such that the servo data from the servo wedges can be quickly processed and used by the data storage device to maintain proper positioning of the read/write heads.

Certain embodiments of the present disclosure involve processing servo data from fewer than all servo wedges being passed over by the read/write heads. Skipping servo wedges can result in consuming less power because various components of data storage devices can operate in a lower power mode.

FIG. 1 shows a schematic of a data storage device 100 such as a hard disk drive. In the case of a hard disk drive, the data storage device 100 can include multiple actuators (i.e., a first actuator 102A and a second actuator 102B) each with one or more read/write heads 104A and 104B to provide concurrent access to magnetic recording media 106 (e.g., magnetic recording disks referred to as a magnetic recording medium in the singular). In certain embodiments, the multiple actuators 102A and 102B share a common pivot axis and are positioned in a stacked arrangement. In such embodiments, the read/write heads 104A coupled to the first actuator 102A access different surfaces of the magnetic recording media 106 than the read/write heads 104B coupled to the second actuator 102B. In other embodiments, the multiple actuators 102A and 102B have separate pivot axes. In such embodiments, the read/write heads 104A coupled to the first actuator 102A can access the same magnetic recording media 106 as the read/write heads 104B coupled to the second actuator 102B. Although only two actuators for the data storage device 100 are shown in FIG. 1, additional actuators can be incorporated into the data storage device 100 or the data storage device 100 may have only one actuator.

The data storage device 100 includes an interface 108 (e.g., an input/output interface) for transferring data to and from the data storage device 100. For example, the interface 108, among other features, can be communicatively coupled between a host 150 (e.g., a data storage system such as a server or laptop) and the read/write heads 104A and 104B to facilitate communication, using a standardized communication protocol, between the read/write heads 104A and 104B and the host 150.

The data storage device 100 can include a system on a chip ("SOC") 110 (shown in dashed lines) that includes a system controller 112, which can include a controller processor 114 (e.g., a microprocessor), a servo processor 116 (e.g., a microprocessor), and memory 117 coupled to the controller processor 114 and the servo processor 116. The interface 108 may also be part of the SOC 110. The SOC 110 can also include one or more read/write channels 118A and 118B, which can encode data associated with write commands and decode data associated with read commands. The SOC 110 may be an integrated circuit such as an application-specific integrated circuit ("ASIC") and field-programmable gate array ("FPGA") that includes instructions (e.g., in the form of firmware) for carrying out various functions of the data storage device 100. For example, the SOC 110 can include circuitry to control and carry out various aspects of the data storage device 100 as described in more detail below. Although the interface 108, system controller 112, etc., are shown as being part of a single SOC, the components and their functions can be distributed among several integrated circuits.

The system controller 112 can be coupled to and control access to a buffer 120, which can temporarily store data associated with read commands and write commands. The buffer 120 can be a volatile memory, such as a dynamic random access memory ("DRAM"), static random access memory ("SRAM"), or other volatile memory.

During operation, the data storage device 100 receives various data transfer commands (e.g., a read command or a write command) from the host 150. Data associated with a write command may be received from the host 150 by the interface 108 and initially stored to the buffer 120. The data is encoded or otherwise processed by a respective read/write channel 118A and 118B and eventually stored to the magnetic recording media 106 via one of the read/write heads 104A or 104B coupled to the respective first actuator 102A and the second actuator 102B. Data associated with a read command may be retrieved from the magnetic recording media 106 and stored in the buffer 120. Such data is then transferred to the host 150 by the interface 108.

The read/write channels 118A and 118B may be used to detect patterns within a signal and generate feedback based on the signal to adjust parameters of the read/write channels 118A and 118B. For example, as will be described in more detail below, servo sectors within servo wedges on the magnetic recording media 106 may include patterns to be detected and servo data to be used to identify a location of the read/write heads 104A and 104B relative to the magnetic recording media 106.

The data storage device 100 includes a servo control system (e.g., a servo control system 200 shown in FIG. 4) carried out by components of the system controller 112 (e.g., the servo processor 116 and the memory 117). The servo control system controls positioning (e.g., rotation) of the actuators 102A and 102B via a voice coil motor (VCM) assembly and can control actuation of microactuators to position the read/write heads 104A and 104B over a desired data track on the magnetic recording media 106 for reading and writing operations.

During operation, a spindle motor 124 rotates the magnetic recording media 106. The actuators 102A and 102B are driven by the VCM assembly to pivot around a pivot bearing. The VCM assembly and any microactuators are arranged to carry out various positioning operations (e.g., track seeking, track settling, track following) that position the read/write heads 104A and 104B over a desired data track of the magnetic recording media 106 to read data from or write data to the desired data track. For example, in response to a command to read data from or write data to a data track located a certain distance away from where a respective read/write head 104A or 104B is currently positioned (i.e., a track-seeking operation), a current may be applied to the voice coil of the VCM assembly to rotate the actuator 102A or 102B (and therefore the read/write head 104A or 104B) towards the desired data track. As the read/write head 104A or 104B nears the desired data track, less current is applied to the VCM assembly such that the read/write head 104A or 104B begins to settle over the desired data track (i.e., a track-settling operation). Once the read/write head 104A or 104B is positioned over the desired data track, the servo control system compensates for small positioning errors (i.e., a track-follow operation) to keep the desired read/write head 104A or 104B over the desired data track on the magnetic recording medium 106 during a read operation or a write operation.

In certain embodiments, the servo processor 116 controls operations of respective pre-amplifiers 126A and 126B, which provide signals to the read/write heads 104A and 104B for writing magnetic transitions to the magnetic recording media 106 and for receiving signals from the read/write heads 104A and 104B in response to detecting magnetic transitions written to the magnetic recording media 106.

Figure 2:
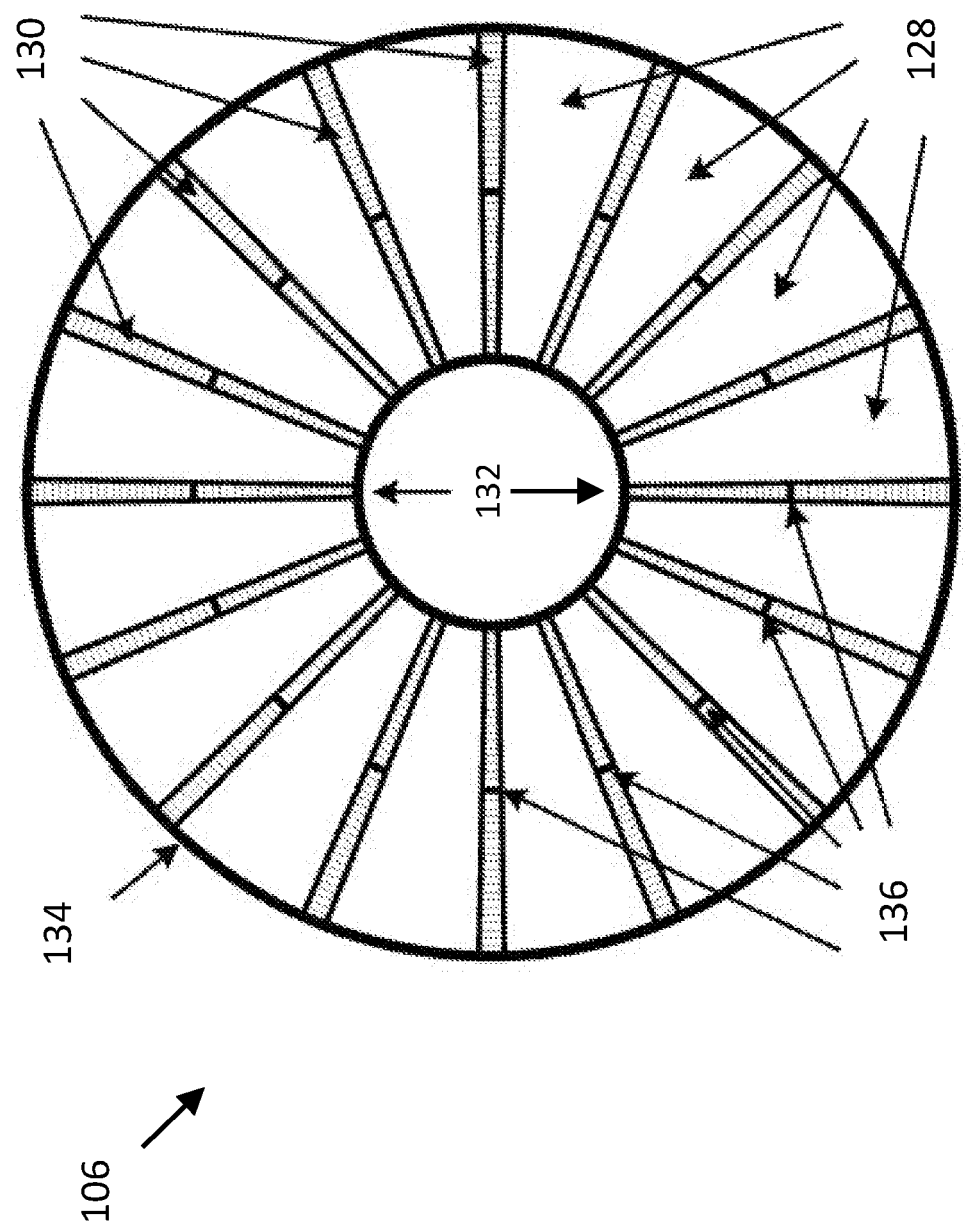
FIG. 2 shows a top view of a magnetic recording media, in accordance with certain embodiments of the present disclosure.

FIG. 2 shows a top view of one side of the magnetic recording medium 106. The magnetic recording medium 106 includes user data regions 128 and servo data regions 130 (referred to throughout this disclosure as servo wedges) positioned between the user data regions 128. The servo wedges 130 extend between an inner diameter 132 and an outer diameter 134 of the magnetic recording medium 106. Data on the magnetic recording media 106 is stored on data tracks. The portion of the data tracks in the user data regions 128 store user data, and the portion of the data tracks in the servo wedges 130 are comprised of servo sectors 136 (shaded in FIG. 2), which store servo data. As such, each servo wedge 130 includes a plurality of servo sectors 136. As shown in FIG. 2, the servo wedges 130 can be positioned at regular intervals around the magnetic recording medium 106.

Figure 3:
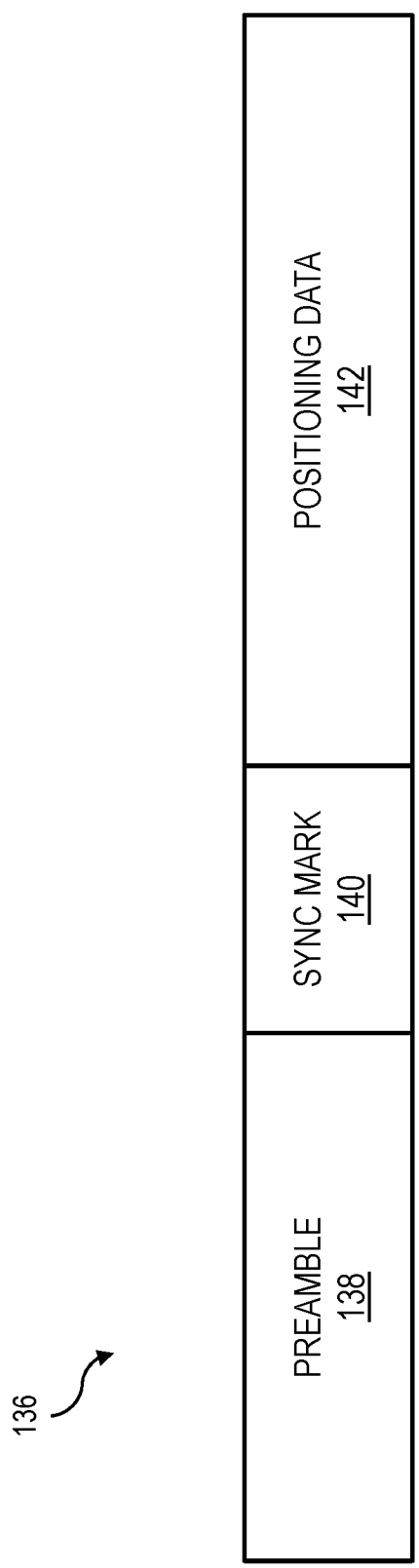
FIG. 3 shows a schematic of a servo sector, in accordance with certain embodiments of the present disclosure.

FIG. 3 shows an example of the type of servo data stored to the servo sectors 136. The servo sectors 136 can include a preamble 138 (e.g., a fixed pattern indicating the beginning of the servo sector 136) followed by what may be referred to as a sync mark 140 (e.g., a synchronization pattern) or a servo timing mark. For example, the preamble 138 may be written with an alternating pattern of magnetic transitions which, when read, generates a sine-wave like read-back signal. When the servo control system identifies the preamble 138, the servo control system may then search for an expected sync mark 140. Once the sync mark 140 is detected, the servo control system can then read positioning data 142 following the sync mark 140 from the servo sectors 136. The positioning data 142 specifies the physical radial and tangential location of the given servo sector 136 on the magnetic recording medium 106. As the read/write heads 104A and 104B pass over each servo sector 136, the servo sector's information is demodulated such that the position of the read/write heads 104A and 104B is known to the system controller 112.

Figure 4:
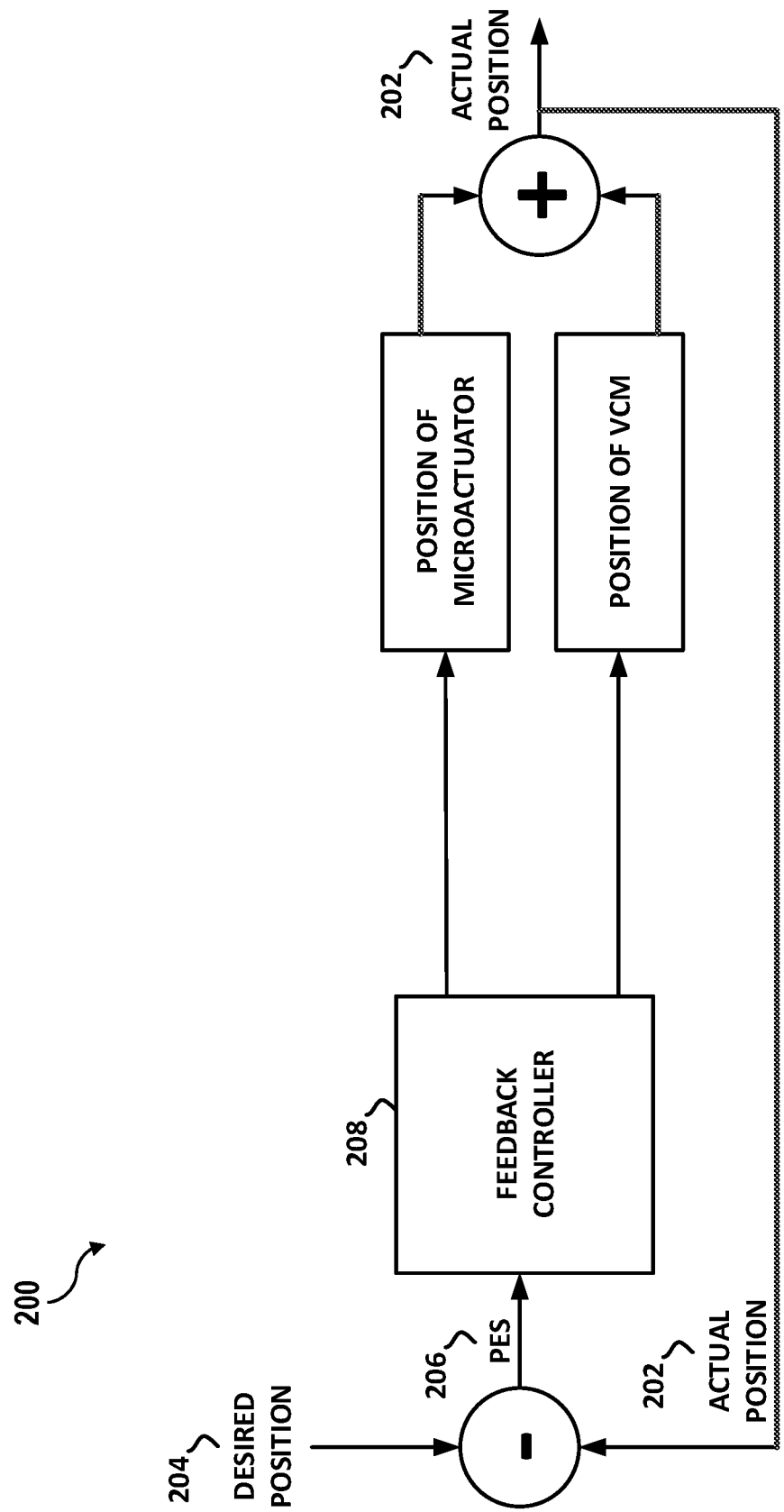
FIG. 4 shows a diagram of a servo control system, in accordance with certain embodiments of the present disclosure.

FIG. 4 provides a high-level representation of a servo control system 200. In operation, the read/write heads 104A and 104B read the positioning data 142 from the servo sectors 136 stored on the magnetic recording media 106 to determine an actual position 202 of the read/write heads 104A and 104B relative to tracks on the magnetic recording media 106. The actual position 202 of the read/write heads 104A and 104B is subtracted from a desired position 204 of the read/write heads 104A and 104B to determine a position error signal (PES) 206, which is the difference between where the read/write heads 104A is and should be positioned. The PES 206 is fed into a feedback controller 208, which controls current to the VCM assembly and—for some operations—controls voltage to the microactuators to position the read/write heads 104A and 104B over the desired track.

As mentioned above, currently, data storage devices read and process the servo data from each servo wedge 130 as the servo wedges 130 are passed over by the read/write heads 104A and 104B. The data storage device 100 consumes a relatively large amount of power to read and process the servo data from the servo wedges 130 quickly. For example, the read/write channels 118A and 118B, the preamplifiers 124A and 124B, and various components of the system controller 112 must be operated so that the servo data read by the read/write heads 104A and 104B can be processed and used by the data storage device 100 to maintain proper positioning of the read/write heads 104A and 104B. For example, measured spacing between servo sectors 136 of the servo wedges 130 can be utilized to modulate frequency of clocks of the system controller 112 used for write operations and read operations such that the frequencies remain consistent relative to the rotational velocity of the magnetic recording media 106. This processing of the servo data from the servo sectors 136 helps provide reliable positioning of the read/write heads 104A and 104B and therefore reliable write operations and read operations.

FIG. 5 shows an example of how the read/write channels 118A and 118B and the preamplifiers 126A and 126B operate during a positioning operation when all servo wedges 130 are read and processed. FIG. 6 shows an example of how the read/write channels 118A and 118B and the preamplifiers 126A and 126B operate in different power modes during a positioning operation when only some servo wedges 130 are read and processed.

Although applicable during other positioning operations, the description below uses a track-seeking operation as an exemplary positioning operation. During a track-seeking operation, the data storage device 100 must actuate one of the actuators 102A or 102B such that the read/write heads 104A or 104B travel from a current data track to a desired data track. For example, while one of the read/write heads 104A or 104B is positioned over a logical block address (LBA) near the inner diameter 132 of the magnetic recording medium 106, the data storage device 100 may receive a command from the host 150 to access data stored at an LBA that is near the outer diameter 134 of the magnetic recording medium 106. To position the read/write head 104A or 104B to the desired LBA to complete the command in time, a relatively large amount of current must be applied to voice coil motor assembly to accelerate and move the read/write head 104A or 104B. When the data storage device 100 receives several of these types of commands in a row, the data storage device 100 can be said to be performing random read and random write operations. During random read and write operations, the data storage device 100 consumes a relatively large amount of power compared to track-settling operations and track-following operations. The amount of power consumed during track-seeking operations can exceed the data storage device's recommended maximum power consumption.

FIG. 5 shows a graph 300 with three plots: a servo gate plot 302 (represented by a solid line), a read/write channel plot 304 (represented by a dashed line), and a preamplifier plot 306 (represented by a phantom line). The servo gate plot 302 represents when, over time, a servo gate signal is initiated. The read/write channel plot 304 represents power consumed by operating one of the read/write channels 118A over time. And, the preamplifier plot 306 represents power consumed by operating one of the preamplifiers 126A over time. Although for simplicity the read/write channel plot 304 and the preamplifier plot 306 are described as representing the power consumed by one of the respective read/write channels and preamplifiers, it is appreciated that similar power consumption profiles apply to other channels and preamplifiers in the data storage device 100.

When the servo gate plot 302 indicates that the servo gate is open (e.g., when the servo gate plot rises in FIG. 5), the servo data stored to the servo wedges 130 can be read by the read/write heads 104A and 104B. When the servo gate is closed, no data can be written to the magnetic recording media 106, thus helping to prevent accidentally overwriting servo data in the servo wedges 130. The servo gate is opened based on predicted timing of when the read/write heads 104A and 104B are going to be positioned over the servo wedges 130. For example, because the system controller 112 (e.g., via the servo processor 116) controls the servo operations and the acceleration and the velocity of the actuators 102A and 102B, the system controller 112 is aware of what point in time the read/write heads 104A and 104B should be positioned over respective servo wedges 130. As such, the system controller 112 is able to predict when the servo wedges 130 begin and increase power consumption to process data read from the servo wedges 130. In certain embodiments, the time between the beginning of each servo gate may be approximately 18-22 microseconds (e.g., 20 microseconds) for a data storage device 100 that rotates its magnetic recording media 106 at a nominal speed of 7200 revolutions per minute.

As shown in FIG. 5, before the servo gate is opened, the power consumed by the read/write channel 118A rises. The power increases so that the read/write channel 118A is prepared to process the data read from the upcoming servo wedge 130 when the servo gate is open. Similarly, as shown in FIG. 5, the power consumed by the preamplifier 126A rises before the servo gate is opened. The power increases so that the preamplifier 126A is prepared to process the data read from the upcoming servo wedge 130 when the servo gate is open. As shown in FIG. 5, the power consumed by the read/write channel 118A and the preamplifier 126A decreases at the same time or nearly the same time the servo gate is closed. This pattern of increasing power consumption and decreasing power consumption for each servo wedge 130 repeats while the track-seeking operation is carried out. Further, although only the power consumed by the read/write channel 118A and the preamplifier 126A are shown in the graph 300, other components of the data storage device 100 such as the various processors of the system controller 112 and the buffer 120 also enter a higher power mode in anticipation of the servo gate opening and when the servo gate is open compared to when the servo gate is closed.

FIG. 6 shows a graph 400 with three plots: a servo gate plot 402 (represented by a solid line), a read/write channel plot 404 (represented by a dashed line), and a preamplifier plot 406 (represented by a phantom line). Like the servo gate plot 302 in FIG. 5, the servo gate plot 402 in FIG. 6 indicates when the servo gate is open or closed. However, unlike FIG. 5, the read/write channel plot 404 and the preamplifier plot 406 in FIG. 6 do not show an increase in power consumption for each opening of the servo gate. Instead, not all servo wedges 130 are read and/or processed (e.g., sampled) during the positioning operation.

In certain embodiments, like that shown in FIG. 6, only every other servo wedge is read and processed during the positioning operation. For example, data from a first servo wedge is read and processed, then the next servo wedge is skipped, and then data from the servo wedge after the skipped servo wedge is read and processed. As such, during the positioning operation, servo data is processed by components of the SOC 110 only every 36-44 microseconds as opposed to every 18-22 microseconds. Although the servo gate is shown as being open, the servo wedge 130 being passed over by the read/write head 104A is not read and processed. Skipping every other servo wedge can reduce power consumption of the data storage device 100 in the range of 150 mW for each actuator in the data storage device 100.

In certain embodiments, additional or fewer servo wedges can be skipped. For example, every two or three or four or more servo wedges can be skipped. Skipping additional servo wedges can further decrease the amount of power consumed during a positioning operation. As another example, two or more servo wedges can be read and processed for each servo wedge that is skipped. In certain embodiments, the number of consecutive skipped servo wedges can change during a positioning operation. For example, more consecutive servo wedges can be skipped at the beginning and middle of a positioning operation, and fewer consecutive servo wedges can be skipped near the end of the positioning operation. In certain embodiments, servo wedges are skipped only during a portion of a positioning operation. For example, servo wedges can be skipped for the first 70% of the stroke length or the time of the positioning operation and then every servo wedge passed over by the read/write heads 104A and 104B can be read and processed during the final 30% of the positioning operation. As another example, servo wedges can be skipped for at least 75-95% of the stroke length or the time of the positioning operation.

Figure 7:
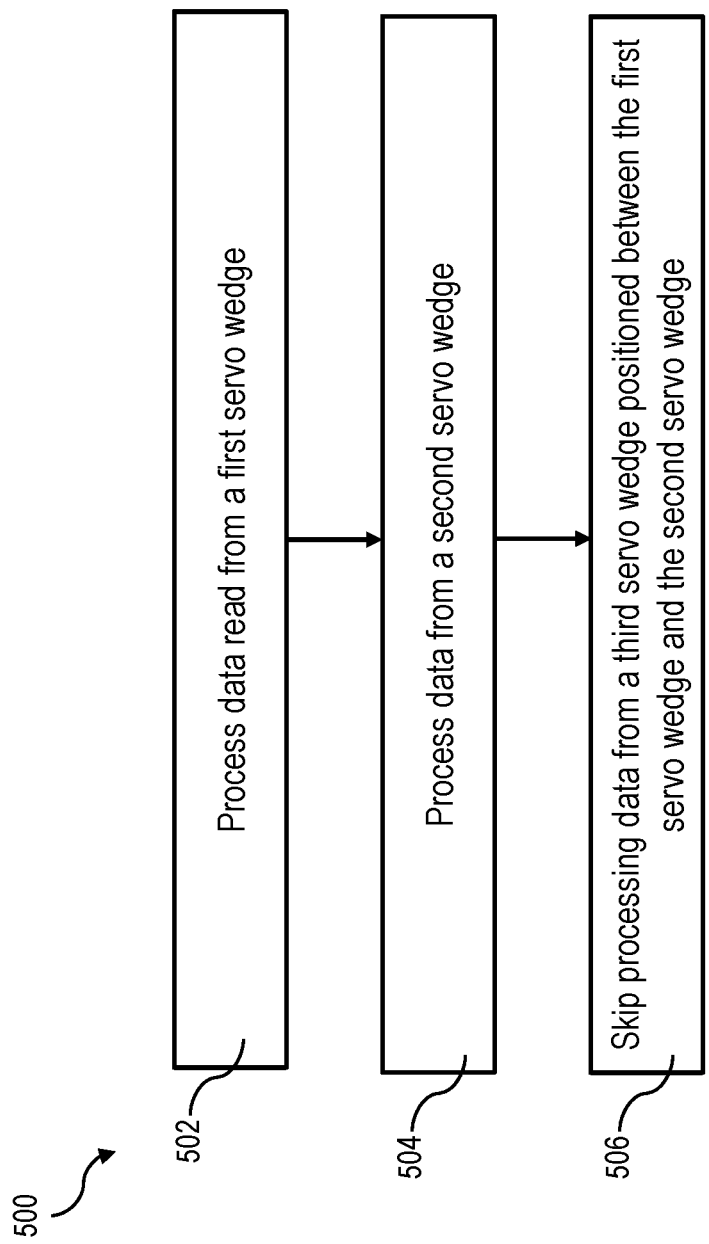
FIG. 7 shows a block diagram of steps of a method, in accordance with certain embodiments of the present disclosure.

FIG. 7 outlines a method 500 for skipping servo wedges to reduce power consumption during positioning operations. The method 500 includes processing data read from a first servo wedge (block 502 in FIG. 5). As described above, servo data read from servo wedges can be processed by components (e.g., the servo processor 116, the read/write channel 118A, and the preamplifier 126A) of the SOC 110. The method 500 further includes processing data from a second servo wedge (block 504 in FIG. 5). The method 500 further includes skipping processing data from a third servo wedge positioned between the first servo wedge and the second servo wedge (block 506 in FIG. 5).

The method can include additional aspects carried out by the data storage device 100. For example, during the processing steps described above, the data storage device 100 can operate the SOC 110 at a first power level, and when the third servo wedge is skipped, the data storage device 100 can operate the SOC 110 at a second power level such that the integrated circuit consumes less power than at the first power level. In certain embodiments, the second power level is active while the read/write head 110A passes between the first servo wedge and the second servo wedge.

Although the description above uses a track-seeking operation as an exemplary positioning operation, the disclosure is applicable for other positioning operations (e.g., track-settling, track-following) and during other modes of the data storage device 100 such as a performance-idle mode. In the performance-idle mode, the data storage device 100 continues to operate the motor 124 and maintains the read/write heads 104A and 104B over the magnetic recording media 106, but the data storage device 100 does not carry out any read or write commands.

Various modifications and additions can be made to the embodiments disclosed without departing from the scope of this disclosure. For example, while the embodiments described above refer to particular features (e.g., data storage devices with dual actuators), the scope of this disclosure also includes embodiments having different combinations of features (e.g., data storage devices with a single actuator or four actuators) and embodiments that do not include all of the described features. Accordingly, the scope of the present disclosure is intended to include all such alternatives, modifications, and variations as falling within the scope of the claims, together with all equivalents thereof.

What is claimed is:

1. A method comprising:
   during a positioning operation,
      processing, via an integrated circuit operating at a first power level, data read from a first servo wedge,
      processing, via the integrated circuit operating at the first power level, data from a second servo wedge, and
      while operating the integrated circuit at a second power level, skipping processing data from a third servo wedge positioned between the first servo wedge and the second servo wedge, wherein the integrated circuit consumes less power in the second power level compared to the first power level.

2. The method of claim 1, wherein the second power level is active while a read/write head passes between the first servo wedge and the second servo wedge.

3. The method of claim 1, wherein positioning operation is a track-seeking operation.

4. The method of claim 1, further comprising:
   skipping processing data from a fourth servo wedge positioned between the first servo wedge and the second servo wedge.

5. The method of claim 1, further comprising:
   skipping processing data from every other servo wedge during only a portion of the positioning operation.

6. The method of claim 5, wherein the portion of the positioning operation is at least 75%.

7. The method of claim 1, wherein a servo gate is open during at least a portion of when the third servo wedge is skipped.

8. An integrated circuit comprising:
   control circuitry configured to:
      predict a beginning of a first servo wedge, a second wedge, and a third servo wedge positioned between the first servo wedge and the second servo wedge, and
      increase power consumption to process data read from the first servo wedge and the second servo wedge but not the third servo wedge.

9. The integrated circuit of claim 8, wherein the control circuitry is configured to open a servo gate at the beginning of the first servo wedge, the second servo wedge, and the third servo wedge.

10. The integrated circuit of claim 8, wherein the control circuitry includes a read/write channel.

11. The integrated circuit of claim 8, wherein the control circuitry includes a system controller, which includes a servo control system.

12. The integrated circuit of claim 8 formed as part of a system on a chip.

13. A data storage device comprising:
   a magnetic recording medium including a first servo wedge, a second servo wedge, and a third servo wedge positioned between the first servo wedge and the second servo wedge; and
   an integrated circuit configured to process data read from the first servo wedge and the second servo wedge but not the third servo wedge, wherein the integrated circuit is configured to increase power consumption to process data read from the first servo wedge and the second servo wedge but not the third servo wedge.

14. The data storage device of claim 13, wherein the integrated circuit is configured to predict a beginning of a first servo wedge, a second wedge, and a third servo wedge positioned between the first servo wedge and the second servo wedge.

15. The data storage device of claim 13, wherein the integrated circuit is configured to process data read from every other servo wedge.

16. The data storage device of claim 13, wherein the data is read during a positioning operation, wherein the integrated circuit configured to skip processing data from servo wedges during only a portion of the positioning operation.

17. The data storage device of claim 13, further comprising:
   an actuator coupled to a read/write head, wherein the read/write head reads the data from the first servo wedge and the second servo wedge.

18. The data storage, device of claim 13, wherein the integrated circuit is configured to predict a beginning of the first servo wedge, the second wedge, and the third servo wedge and to increase power consumption to process data read from the first servo wedge and the second servo wedge but not the third servo wedge.

* * * * *